Patented Aug. 26, 1947

2,426,547

UNITED STATES PATENT OFFICE 2,426,547

ANTHRAQUINONE DYESTUFFS

Gerard Dunstan Buckley and Henry Alfred Piggott, Blackley, Manchester, England, assignors to Imperial Chemical Industries Limited, a corporation of Great Britain No Drawing. Application March 29, 1944, Serial No. 528,625. In Great Britain April 12, 1943

4 Claims. (Cl. 260—373)

This invention relates to new acid wool dyes of the anthraquinone series.

According to the invention we provide a process for the manufacture of new acid wool dyes of the anthraquinone series which comprises reacting a C-aralkylcycloaliphatic amine of the formula $NH_2X(CH_2)_nY$ in which X stands for a cycloaliphatic residue which may carry alkyl groups as substituents, Y stands for an aryl radical, substituted or not, and $n$ stands for a whole number from 1 to 3, with an anthraquinone derivative which may be wholly or partly in the leuco form which contains in the $\alpha$-positions at least one substituent replaceable by an imino-radical by reaction with a primary amine, and which contains in the remaining positions any substituintroducing one or more $SO_3H$ groups into the molecule of the reaction product.

As C-aralkylcycloaliphatic amines which may be employed according to the invention there may be mentioned cis-2-benzylcyclohexylamine, trans-2-benzyl-cyclohexylamine, 2 - benzylcyclopentylamine, 6-methyl-2-benzylcyclohexylamine, 2-p-methoxybenzylcyclohexylamine, 2-$\gamma$ - phenylpropylcyclohexylamine, 2-o-chlorobenzylcyclohexylamine, 2-$\alpha$-naphthylmethylcyclohexylamine, and 2 - p - methylbenzyl - 4'- methylcyclohexylamine. These amines may be made, for example, from the corresponding aralkylcycloaliphatic ketone by reduction of its oxime, as is described in the case of trans-2-benzylcyclohexylamine by Schöpf and Boettcher (Annalen, 448, 7).

Substituents which, in the $\alpha$-position of the anthraquinone nucleus are replaceable by iminoradicals by reaction with a primary amine are, for example, hydroxy, alkoxy, aryloxy, sulphonic acid, nitro, amino and alkylamino groups and chlorine and bromine atoms. Thus there may for example be used the following anthraquinone derivatives: quinizarin, 4-bromo-1-methylamino-anthraquinone, 1-chloroanthraquinone, 4-bromo-1-amino-2-methylanthraquinone, 1:4:5:8-tetrahydroxyanthraquinone, 1:4 - diaminoanthraquinone, 2:4-dibromo-1-aminoanthraquinone, anthraquinone-1-sulphonic acid and 1:5-dinitroanthraquinone.

As said these anthraquinone derivatives may be used in the process of the invention either wholly or partly in the leuco form.

The interaction of the C-aralkylcyclo aliphatic amine with the anthraquinone derivative is conveniently brought about by heating together the reactants. The heating process may advantageously be carried out in a solvent, preferably one of fairly high boiling point, for example butanol or isobutanol. When the anthraquinone derivative is used wholly or partly in the leuco form the condensation product is obtained also wholly or partly in the leuco form and this may be oxidised prior to isolation conveniently, by, for example, heating with nitrobenzene or other suitable oxidising agent.

The introduction of $SO_3H$ groups into the molecule of the reaction product may be brought about by treatment of the reaction product with known sulphonating agents, for example with sulphuric acid, with oleum or with chlorosulphonic acid. Alternatively, in cases where the reaction product contains one or more substituents capable of interaction with an alkali sulphite an $SO_3H$ group or groups may be introduced by such interaction.

The sulphonated reaction products are acid dyestuffs which dye wool in bright shades of blue or green of outstanding fastness to light and to washing.

The invention is illustrated but not limited by the following examples in which the parts are by weight:

Example 1

16 parts of trans-2-benzylcyclohexylamine (made as described by Schöpf Boettcher in Annalen, 448, 7), 7.5 parts of leuco-quinizarin and 60 parts of isobutanol are stirred and boiled together during 42 hours. 45 parts of nitrobenzene are then added, the temperature of the mixture is raised to 170° C. and the isobutanol is allowed to distil off. The mixture is stirred at this temperature during 1 hour when the leuco compound is completely oxidised. It is then cooled and 90 parts of ethanol are added. When allowed to stand the condensation product separates in the form of blue needles.

5 parts of this condensation product, which is the 1,4-di(2'-benzyl-cyclohexylamino) anthraquinone, is added during half an hour to 90 parts of sulphuric acid containing 96% $H_2SO_4$ which is stirred and kept at 15–20° C. The mixture is then stirred at 20° C. during 2 hours and is then poured into 250 parts of a mixture of ice and water. A solid is precipitated which is filtered off, and dissolved in 500 parts of water containing sufficient caustic soda to neutralise the acid. The dyestuff is precipitated from this solution in the form of a blue powder by addition of 10 parts of common salt. The product dyes wool from an acid bath in bright greenish blue shades of very good fastness to light and to washing.

*Example 2*

7 parts of quinizarin, 7 parts of leucoquinizarin, 120 parts of butanol and 28 parts of 2-benzylcyclopentylamine (made by reducing the oxime of 2-benzylcyclopentanone with sodium and amyl alcohol) are stirred and boiled together during 42 hours. The condensation product is oxidised with nitrobenzene and isolated as described in Example 1. It consists of bright blue crystals and is the 1,4-di(2'-benzyl-cyclopentylamino)-anthraquinone.

It is sulphonated with 96% sulphuric acid as is described in Example 1 and there is obtained a sulphonic acid which dyes wool from an acid bath in greenish blue shades, of good fastness to light and to washing.

*Example 3*

10 parts of trans-2-benzylcyclohexylamine, 2 parts of 4-bromo-1-methylaminoanthraquinone and 1 part of sodium acetate are mixed and stirred together at 190° C. during 6 hours. To the mixture there is then added 40 parts of ethanol. It is then allowed to stand. The crude 1-methylamino-4-(2'-benzylcyclohexylamino)-anthraquinone which separates is filtered off. It may be purified by recrystallisation from ethylene glycol monoethyl ether, whereby it is obtained in the form of bluish-violet needles of M. P. 157–160° C.

It is sulphonated by treatment with sulphuric acid monohydrate at 20° C., and the resultant sulphonic acid is isolated in the customary manner. It dyes wool from an acid bath in brilliant blue shades of excellent fastness to light and to washing.

*Example 4*

7.5 parts of leucoquinizarin, 17.5 parts of a mixture of cis- and trans-2-benzylcyclohexylamine (made by hydrogenation in liquid ammonia solution using a nickel catalyst of 2-benzylidenecyclohexanone), and 15 parts of phenol are heated at 125–130° C. with stirring for 17 hours, then 3.5 parts of nitrobenzene are added, and heating is continued for 4 hours. The mixture is then cooled to 60° C., 50 parts of methanol are added, and the blue crystalline solid which separates is filtered off. This product, which is the 1,4-di(2'-benzyl-cyclohexylamino)anthraquinone, is sulphonated by treatment with 96% sulphuric acid as is described in Example 1. The dyeing and fastness properties of the product thus obtained are identical with those of the product described in Example 1.

*Example 5*

5 parts of leucoquinizarin, 12.5 parts of 6-methyl-2-benzylcyclohexylamine (made by hydrogenation of a liquid ammonia solution of 6-methyl-2-benzylidenecyclohexanone), and 10 parts of phenol are heated at 125–130° C. for 17 hours and the product, which is the 1,4-di(6'-methyl-2'-benzyl-cyclohexylamino)anthraquinone, is isolated as is described in Example 4, and sulphonated as is described in Example 1. The sulphonic acid thus obtained dyes wool in somewhat greener shades than those of the dyestuff made as described in Examples 1 and 4, the fastness to light and washing being excellent.

*Example 6*

7.5 parts of leucoquinizarin, 20.4 parts of 2-(p-methoxybenzyl)cyclohexylamine (made by hydrogenation in liquid ammonia of 2-(p-methoxybenzylidene)cyclohexanone), and 15 parts of phenol are heated together at 125–130° C., and the product, which is the 1,4-di[2'-(p-methoxybenzyl)-cyclohexylamino]anthraquinone, is isolated and sulphonated as is described in Example 5. The product dyes wool from an acid bath in bright greenish blue shades of very good fastness to light and washing.

*Example 7*

4.5 parts of leucoquinizarin, 12.5 parts of 2-(o-chlorobenzyl)-cyclohexylamine (made by hydrogenation in liquid ammonia of 2-(o-chlorobenzylidene)cyclohexanone), and 9 parts of phenol are heated together at 125–130° C., and the product, which is the 1,4-di[2'(o-chlorobenzyl)-cyclohexylamine]anthraquinone, is isolated and sulphonated as is described in Example 5. The dyeing and fastness properties of this dyestuff on wool are similar to those of the dyestuff made as described in Example 6.

*Example 8*

5.0 parts of leuco-1:4:5-trihydroxyanthraquinone, 10.5 parts of 2-benzyl-cyclohexylamine, 10.0 parts of phenol, and 2.0 parts of boric acid are heated at 95–100° C. for 7 hours with stirring, 3.5 parts of nitrobenzene then added and heating is continued for a further 4 hours. The product is isolated and sulphonated as is described in Example 7 and there is obtained a blue dyestuff having dyeing and fastness properties similar to those of the dyestuff made as described in Example 6. This product is substantially the 1,4-di(2'-benzylcyclohexylamino)-5-hydroxyanthraquinone.

We claim:

1. The sulfonic acid derivatives of the anthraquinone compound of the general fromula:

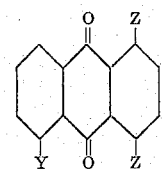

in which Y stands for a substituent of the group consisting of —H and —OH and Z in each case stands for the radical:

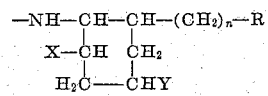

wherein R represents an aromatic radical containing a single benzene nucleus and X and Y stand for a substituent of the group consisting of —H and —CH₃, and $n$ stands for a whole number from 1 to 3.

2. The sulfonic acid derivative of 1,4-di(2'-benzyl-cyclohexylamino)anthraquinone.

3. The sulfonic acid derivative of 1,4-di(6'-methyl-2'-benzyl-cyclohexylamino(anthraquinone.

4. The sulfonic acid derivative of 1,4-di(2'-benzyl-cyclohexylamino)-5-hydroxyanthraquinone.

GERARD DUNSTAN BUCKLEY.
HENRY ALFRED PIGGOTT.

(References on following page)

REFERENCES CITED

The following references are of record in the file of this patent:

UNITED STATES PATENTS

| Number | Name | Date |
|---|---|---|
| 1,688,256 | Weinand | Oct. 16, 1928 |
| 1,820,023 | Kalischer | Aug. 25, 1931 |
| 1,821,043 | Weinand | Sept. 1, 1931 |
| 2,029,239 | Kranzlem | Jan. 28, 1936 |
| 2,077,539 | Weinand | Apr. 20, 1937 |

FOREIGN PATENTS

| Number | Country | Date |
|---|---|---|
| 381,954 | Great Britain | Oct. 3, 1932 |
| 462,694 | Great Britain | Mar. 15, 1937 |
| 276,408 | Great Britain | Aug. 15, 1927 |

Certificate of Correction

August 26, 1947.

Patent No. 2,426,547.

GERARD DUNSTAN BUCKLEY ET AL.

It is hereby certified that errors appear in the printed specification of the above numbered patent requiring correction as follows: Column 1, line 17, before the word "introducing" insert *ent other than $SO_3H$ groups, and subsequently*; column 2, line 31, for "Schöpf Boettcher" read *Schöpf and Boettcher*; and that the said Letters Patent should be read with these corrections therein that the same may conform to the record of the case in the Patent Office.

Signed and sealed this 14th day of October, A. D. 1947.

[SEAL]

THOMAS F. MURPHY,
*Assistant Commissioner of Patents.*